(12) United States Patent
Kogure et al.

(10) Patent No.: US 7,355,390 B2
(45) Date of Patent: Apr. 8, 2008

(54) ROTATION ANGLE SENSOR

(75) Inventors: Yoshihiro Kogure, Gunma (JP); Koichi Kusuyama, Gunma (JP)

(73) Assignee: Hitachi Unisia Automotive, Ltd., Atsugi-Shi (JP)

( * ) Notice: Subject to any disclaimer, the term of this patent is extended or adjusted under 35 U.S.C. 154(b) by 191 days.

(21) Appl. No.: 10/953,531

(22) Filed: Sep. 30, 2004

(65) Prior Publication Data
US 2005/0134258 A1    Jun. 23, 2005

(30) Foreign Application Priority Data
Dec. 18, 2003    (JP) .............................. 2003-421036

(51) Int. Cl.
G01B 7/30    (2006.01)

(52) U.S. Cl. ................................. 324/207.25
(58) Field of Classification Search ............ 324/207.25
See application file for complete search history.

(56) References Cited

U.S. PATENT DOCUMENTS

| 4,896,235 A | * | 1/1990 | Takino et al. ............ 360/327.3 |
| 5,798,639 A | | 8/1998 | McCurley et al. |
| 5,811,968 A | | 9/1998 | Nakazawa et al. |
| 5,889,400 A | | 3/1999 | Nakazawa et al. |
| 6,268,722 B1 | * | 7/2001 | Kogure et al. ......... 324/207.25 |
| 6,275,027 B1 | * | 8/2001 | Kogure et al. ........... 324/207.2 |

FOREIGN PATENT DOCUMENTS

| JP | 01210135 | * | 6/1990 |
| JP | 7-260412 A | | 10/1995 |
| JP | 09-189508 A | | 7/1997 |
| JP | 09-189509 A | | 7/1997 |
| JP | 09-243311 A | | 9/1997 |
| JP | 09-243312 A | | 9/1997 |
| JP | 11-023213 A | | 1/1999 |
| JP | 2000-97605 A | | 4/2000 |

* cited by examiner

*Primary Examiner*—Reena Aurora
(74) *Attorney, Agent, or Firm*—Antonelli, Terry, Stout & Kraus, LLP.

(57) ABSTRACT

A rotation angle sensor includes a rotatable magnet, at least one yoke located at a position to confront a magnetic pole, and a magnetic sensing device to sense magnetic flux density varying in accordance with a confronting area between the yoke and the magnet. The yoke is electrically connected with the magnetic sensing device through a nonmagnetic conductor.

16 Claims, 5 Drawing Sheets

ROTATION ANGLE SENSOR

BACKGROUND OF THE INVENTION

The present invention relates to a rotation angle sensor sensing a rotation angle of a rotary member, and more specifically to a rotation angle sensor sensing a throttle valve opening and an accelerator pedal opening of a vehicular engine.

U.S. Pat. No. 5,798,639 (corresponding to Published Japanese Patent Application Kokai No. H07(1995)-260412) shows a rotation angle sensor including a magnetic circuit and an electric circuit. The magnetic circuit is composed of a magnet provided in a rotary shaft rotating in accordance with a throttle valve opening, and yokes surrounding the magnet nearly over the full circumference. The electric circuit includes a magnetoelectric transducing element, such as a Hall effect device, disposed between the yokes, and a signal processing circuit.

The Hall effect device senses magnetic flux density varying in accordance with the rotation angle, in the magnetic circuit, and the signal processing circuit determines the rotation angle by processing a signal from the Hall effect device.

SUMMARY OF THE INVENTION

In this rotation angle sensor, the magnetic circuit of the yokes and the electric circuit of the magnetoelectric transducing element are isolated electrically by a structure retaining member made of nonmagnetic material such as high-polymer resin. In this arrangement, the magnetic circuit is not held equal in electric potential with respect to the electric circuit.

Therefore, an electric potential difference is generated in the magnetic circuit by electric charges stored in the magnetic circuit. This electric potential difference may cause electron generation or variation in positive hole density in the magnetoelectric transducing element and the signal processing circuit in the electric circuit. Consequently, operations of magnetoelectric transducing element and the signal processing circuit are changed, and the characteristic of the device is changed.

When, for example, electrons are induced in an N-type semiconductor region by this electric potential difference, the resistance of the N-type semiconductor region decreases. When electrons are induced in a P-type semiconductor region by this electric potential difference, the resistance of the P-type semiconductor region increases. In some cases, an inversion layer may be generated.

It is an object of the present invention to provide a rotation angle sensor which suppresses a change of the output characteristic, and enhances reliability.

According to the present invention, a rotation angle sensor comprises: a magnet rotatable about a rotation axis; a yoke located at a position to confront a magnetic pole of the magnet radially, and forming a magnetic circuit with the magnet; a magnetic sensing device to sense magnetic flux density varying in accordance with a confronting area between the yoke and the magnet; and a nonmagnetic conductor electrically connecting the yoke and the magnetic sensing device.

DETAILED DESCRIPTION OF THE INVENTION

Figure 1A:
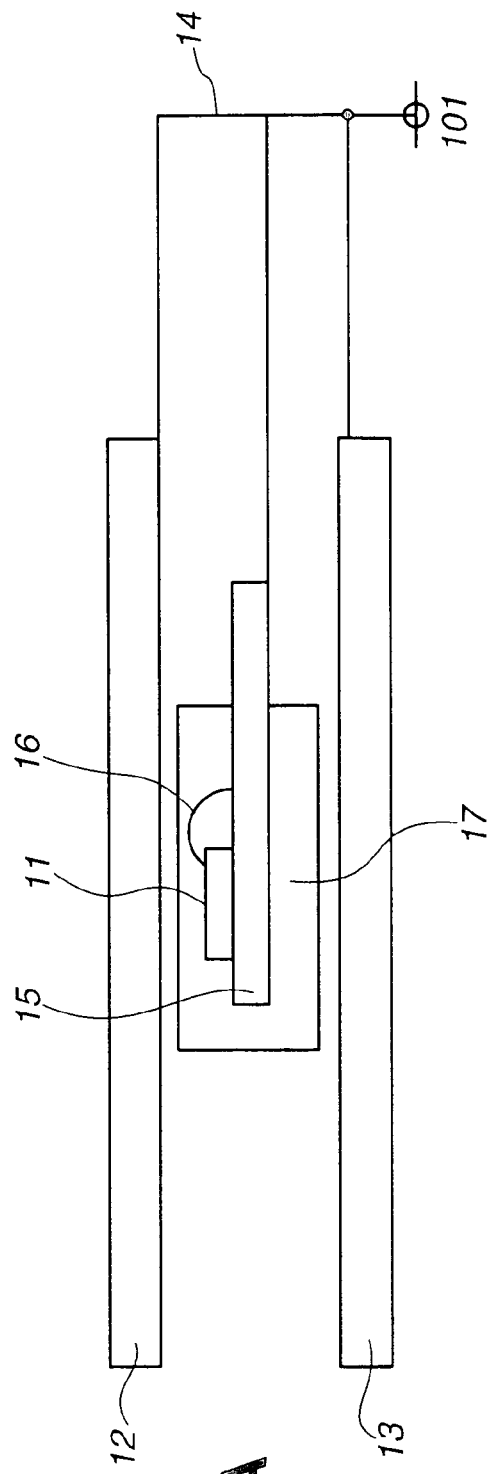
FIGS. 1A and 1B are schematic views showing two different examples of a rotation angle sensor according to a first embodiment of the present invention.
Figure 1B:
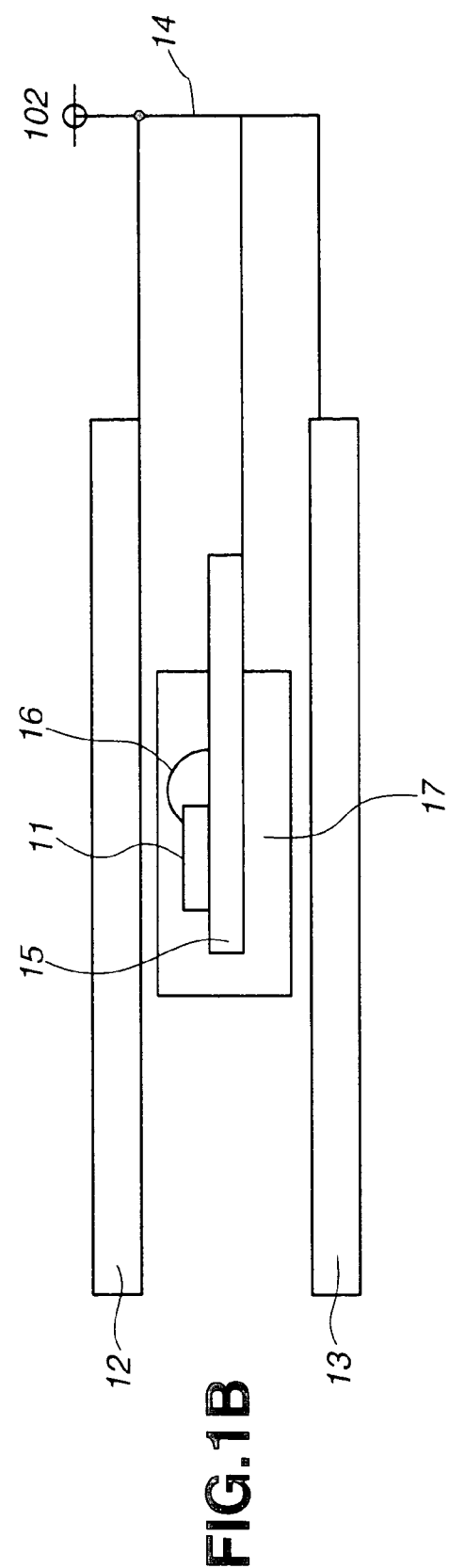

FIGS. 1A and 1B show a rotation angle sensor according to a first or second embodiment of the present invention. This rotation angle sensor includes a Hall effect device 11 as a magnetoelectric transducing element or magnetic sensing device, and a yoke structure including yokes 12 and 13 for introducing magnetic flux generated by a magnet (not shown in FIGS. 1A and 1B) into the Hall effect device 11 disposed between the yokes 12 and 13.

The Hall effect device 11 is connected with a low electric potential side of power supply 101, as shown in FIG. 1A. Alternatively, the Hall effect device 11 is connected with a high electric potential side of power supply 102, as shown in FIG. 1B. The yokes 12 and 13 are connected to the low or high electric potential side of power supply 101 or 102 by a conductor 14 including at least one portion made of nonmagnetic conductive material such as copper or aluminum. Therefore, the Hall effect device 11 and each yoke 12 or 13 are electrically short-circuited, so that a electric potential difference therebetween is eliminated. At the same time the Hall effect device 11 and the yokes 12 and 13 are isolated magnetically.

The Hall effect device 11 is mounted on a lead frame 15, and electrically connected to the lead frame 15 by wire bonding 16. The Hall effect device 11 is molded in a resin package 17.

Figure 2:
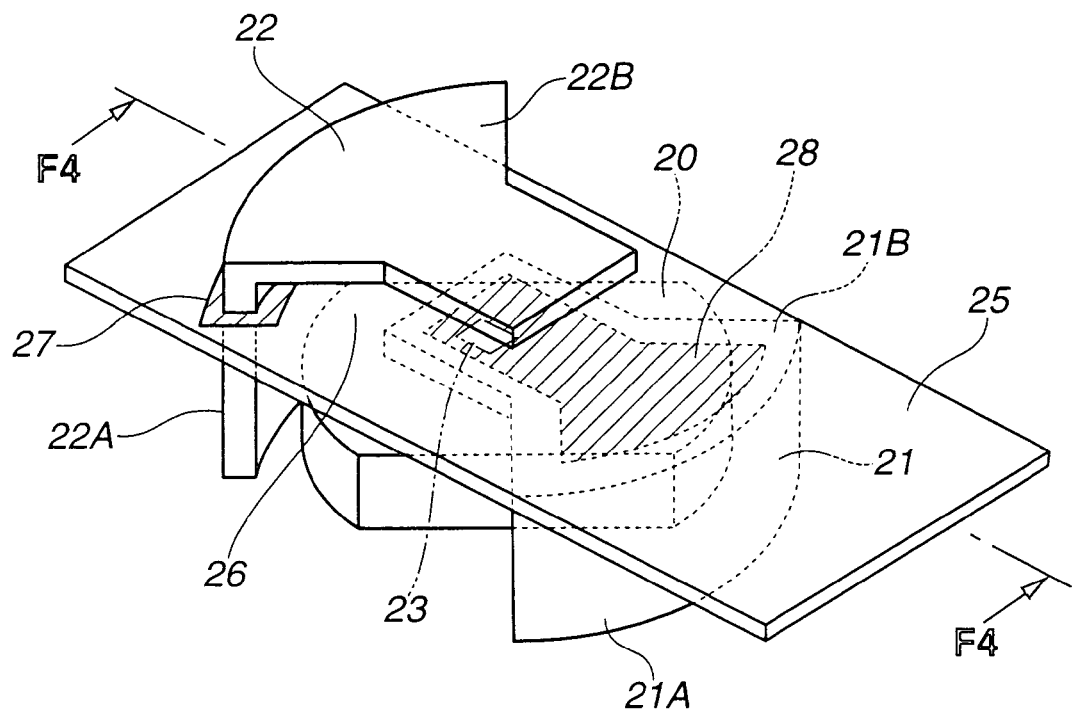
FIG. 2 is a perspective view showing the rotation angle sensor of FIG. 1
Figure 3:
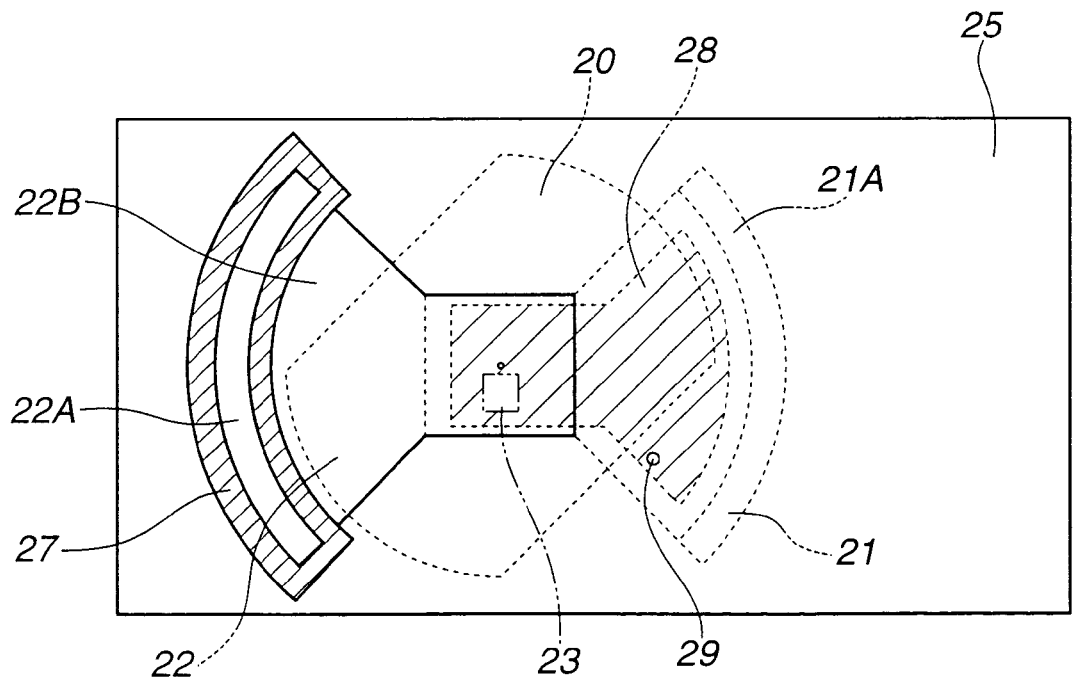
FIG. 3 is a plan view showing the rotation angle sensor shown in FIG. 2.
Figure 4:
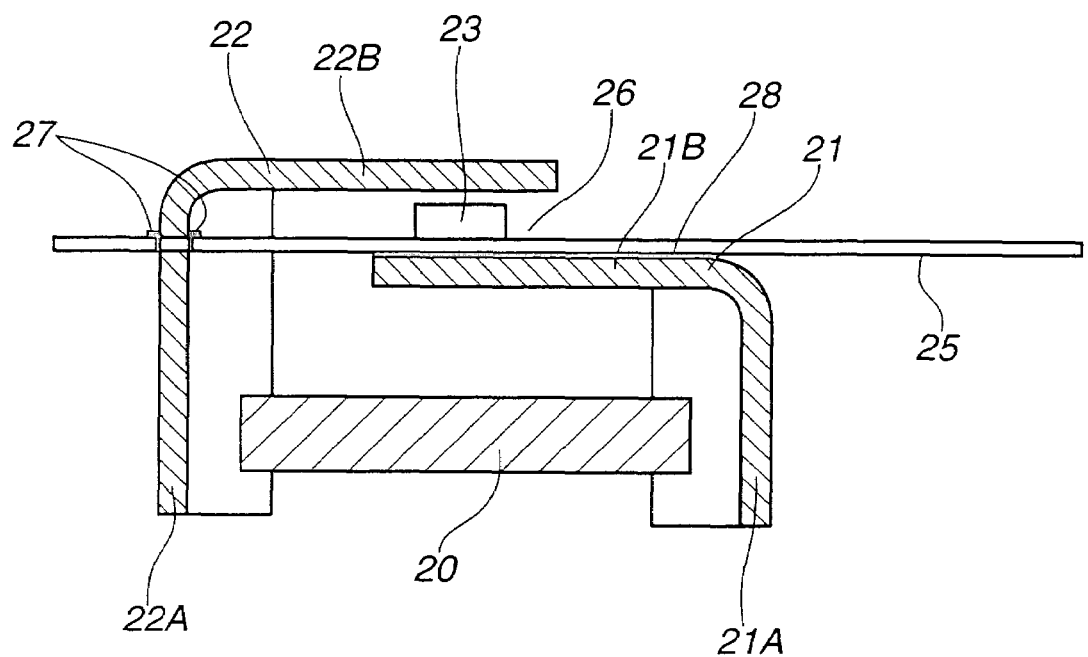
FIG. 4 is a sectional view taken along a section line F4-F4 of FIG. 2.

FIGS. 2-4 show more in detail the connection between a yoke structure and a low or high electric potential side of power supply by a nonmagnetic conductor according to the first embodiment. This rotation angle sensor shown in FIGS. 2–4 is composed of a magnet 20, a yoke structure including a pair of yokes 21 and 22, a Hall effect device 23 serving as a magnetic sensing device, and a printed circuit board 25.

The magnet 20 is in the form of a rectangle or a oval shape (or a shape of a racetrack). The magnet 20 extends from one end to the other in the lengthwise direction, and has magnetic poles in both ends, respectively. The magnet 20 produces magnetic flux to be sensed by the Hall effect device 23.

The yoke structure forms the magnetic circuit with the magnet 20. The yoke 21 is made of magnetic material such as pure iron (SUYB, SUYP) or Fe-Ni alloy, and arranged to conduct the magnetic flux generated by the magnet 20 to the Hall effect device 23, as described later. The yoke 21 of this example includes a first pole piece portion 21A and a first overhang portion 21B. The first pole piece portion 21A is in the form of an arcuate plate. The first pole piece portion 21A confronts the magnet 20 radially across a predetermined constant radial gap. The first overhang portion 21B is in the form of a flat plate, and extends radially inwardly from the first pole piece portion 21A over the magnet 20. The first overhang portion 21B covers a part of the magnet 20 from above, and projects beyond the axis of the magnet 20. The first overhang portion 21B confronts the magnet 20 axially across a predetermined constant axial gap in the direction of the axis of the magnet 20.

The yoke 22 is made of the magnetic material like the yoke 21, located at a position diametrically opposite to the position of the yoke 21 to form the magnetic circuit, and arranged to conduct the magnetic flux generated by the magnet 20 to the Hall effect device 23, as described later. Like the yoke 21, the yoke 22 includes a second pole piece portion 22A and a second overhang portion 22B. The second pole piece portion 22A is in the form of an arcuate plate. The second pole piece portion 22A confronts the magnet 20 radially across a predetermined constant radial gap. The second overhang portion 22B in the form of a flat plate extends radially inwardly from the second pole piece portion 22A across the axis of the magnet 20. The second overhang portion 22B confronts the magnet 20 axially at a predetermined constant axial gap in the direction of the axis of the magnet 20.

The second pole piece portion 22A confronts the first pole piece portion 21A diametrically across the magnet 20. Each of the first and second pole piece portions 21A and 22A is curved in the form of a circular arc having a predetermined radius of curvature with respect to the rotation axis of the magnet 20. Each pole piece portion 21A or 22A extends circumferentially around the axis of the magnet 20 through a substantially equal angle. In a cross section, each of the first and second pole piece portions 21A and 21B is in the form of a circular arc, and the angle subtended at the center by the arc of the second pole piece portion 22A is substantially equal to that of the first pole piece portion 21A.

The second overhang portion 22B extends radially inwardly from the upper end of the second pole piece portion 22A, like the first overhang portion 21B, beyond the position of the axis of the magnet 20, and overlaps the first overhang portion 21B across a predetermined axial gap 26. The Hall effect device 23 is disposed axially between the first and second overhang portions 21B and 22B, as best shown in FIG. 4.

The Hall effect device 23 is a component of an internal electric circuit. The Hall effect device 23 is mounted on a printed circuit board 25, and disposed within the axial gap 26 between the first overhang portion 21B below and the second overhang portion 22B above. The Hall effect device 23 senses the magnetic flux in a direction parallel to the rotation axis of the magnet 20, and perpendicular to the magnetizing direction of the magnet 20. The Hall effect device 23 outputs a sensor signal proportional to the magnetic flux density in the magnetic circuit composed of the magnet 20, and the yokes 21 and 22. The Hall effect device 23 is connected to a signal processing circuit (not shown). The signal processing circuit processes the sensor signal indicative of the magnetic flux density introduced by the yokes 21 and 22, and thereby determines the rotation angle.

The printed circuit board 25 supports the Hall effect device 23 at the position between the yokes 21 and 22, as mentioned above. Moreover, the signal processing circuit (not shown) is formed on or in the printed circuit board. The board 25 is formed with a slot passing through the board 25. The slot is curved in conformity with the curvature of the second pole piece portion 22A of the yoke 22, and arranged to receive the pole piece portion 22A. The second pole piece portion 22A passes through the slot of the board 25. The second pole piece portion 22A of the yoke 22 is fit in the slot so as to pass through the board 25.

A conductive pattern 27 is formed on the printed circuit board 25. In this example, the conductive pattern 27 includes an upper portion formed on a surface of the board 25, and an inner portion formed within the slot, on inner side wall surfaces defining the slot. The upper portion of the conductive pattern 27 of this example is formed on the upper surface of the board 25, in a region fringing the slot. A conductive pattern 28 is formed on the lower surface or back surface of the board 25. The conductive pattern 28 is similar in the surface shape to the first overhang portion 21B, as shown in FIGS. 2 and 3. The conductive pattern 28 confronts the upper surface of the first overhang portion 21B.

The conductive patterns 27 and 28 are made of a nonmagnetic conductive material such as copper or aluminum. The conductive pattern 27 is electrically connected to the second pole piece portion 22A of the yoke 22 inserted through the slot of the board 25 by, for example, one of welding, clamping, soldering, wire bonding, and nonmagnetic conductive adhesive. The conductive pattern 27 is connected to a wiring or interconnection pattern (not shown) formed on the upper surface of the printed circuit board 25. The conductive pattern 27 is connected, through the wiring pattern, with the low electric potential side of power supply 101 or the high electric potential side of power supply 102 of the Hall effect device 23. Therefore, the yoke 22 is electrically connected, through the conductive pattern 27 and the wiring pattern, to the low or high electric potential side of power supply 101 or 102 of the Hall effect device 23.

The conductive pattern 28 is electrically connected through a through hole 29 formed in the printed circuit board 25, to the wiring pattern on the upper surface of the board 25, by, for example, one of welding, clamping, soldering, wire bonding, and nonmagnetic conductive adhesive. The through hole 29 extends through the board 25 from the lower surface to the upper surface of the board 25. The wiring pattern is connected to the low or high electric potential side of power supply 101 or 102 connected with the Hall effect device 23. Therefore, the yoke 21 is electrically connected, through the conductive pattern 28 and the wiring pattern, to the low or high electric potential side of power supply 101 or 102 of the Hall effect device 23.

The yokes 21 and 22 are connected to the identical electric potential of power supply connected to the Hall effect device 23. Therefore, when the yoke 21 is connected to the low electric potential side of power supply 101, the yoke 22 is also connected to the low electric potential side of power supply 101. When the yoke 21 is connected to the high electric potential side of power supply 102, the yoke 22 is also connected to the high electric potential side of power supply 102. Moreover, the signal processing circuit is connected to the low or high electric potential side of power supply 101 or 102 of the Hall effect device 23.

In this arrangement, the yokes 21 and 22 guides the magnetic flux generated by the magnet 20, to the Hall effect device 23. The Hall effect device 23 generates the sensor signal indicative of the magnetic flux density introduced into the Hall effect device 23. The sensor signal is proportional to the magnetic flux density. This rotation angle sensor can determine the rotation angle of the magnet 20, i.e., the rotation angle of the rotary shaft rotating as unit with the magnet, by processing the sensor signal.

As described above, according to the first embodiment, the magnetic circuit of the yokes 21 and 22 is connected, by the nonmagnetic conductor (14, 27, 28), with the low or high electric potential side of power supply 101 or 102 of the electric circuit including the Hall effect device 23. Therefore, the arrangement of the nonmagnetic conductor can act to eliminate an electric potential difference between the magnetic circuit and the electric circuit, and at the same time isolates the yokes and the magnetic sensing device magnetically. Therefore, this arrangement can protect the magnetoelectric transducing element from electrostatic destruction, and prevent resistance change and characteristic change of a semiconductor device due to electron generation or variation in positive hole density in the electric circuit.

The nonmagnetic conductor connects the magnetic circuit and the electric circuit by using one of welding, clamping, soldering, wire bonding, and nonmagnetic conductive adhesive. Therefore, this rotation angle sensor can ensure both the proper operation of the magnetic circuit and the electrical connection, without incurring magnetic interference.

The magnetoelectric transducing element can be electrically shielded by the magnetic circuit connected to a fixed electric potential. Therefore, this rotation angle sensor can prevent the accuracy in the measurement from being lowered by external electric field.

Figure 5:
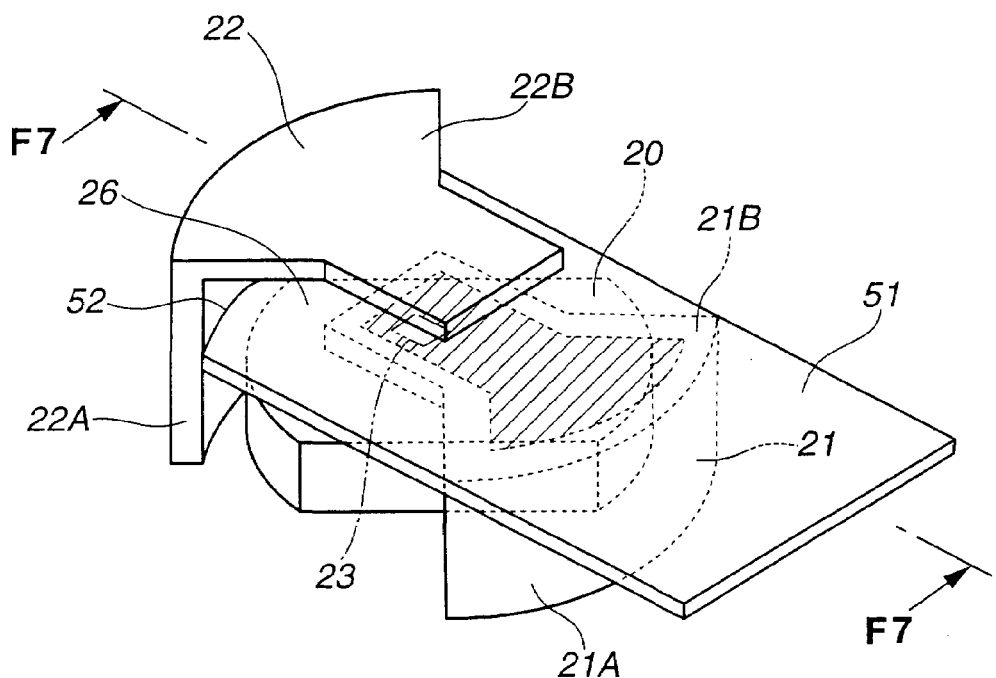
FIG. 5 is a perspective view showing a rotation angle sensor according to a second embodiment of the present invention.
Figure 6:
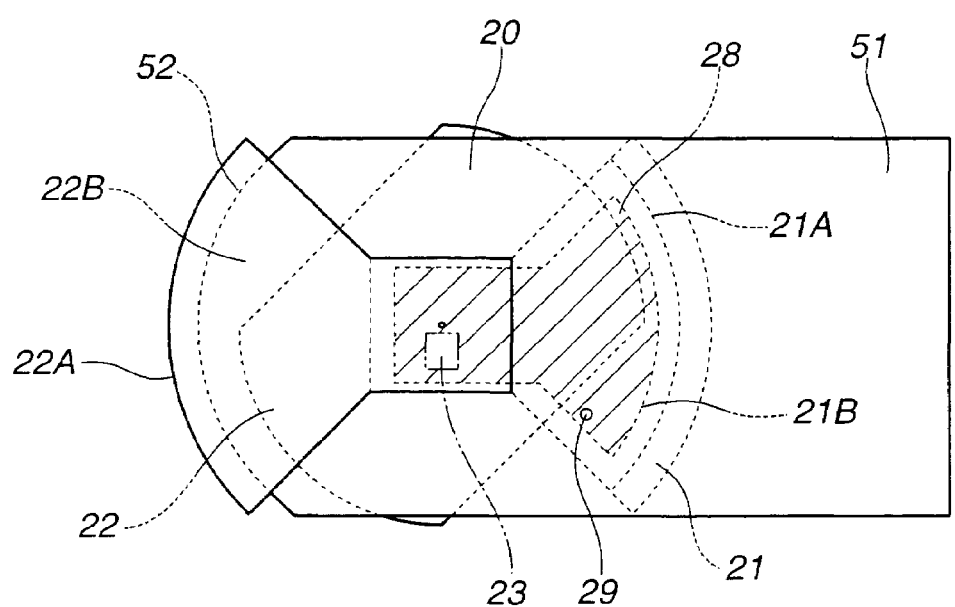
FIG. 6 is a plan view showing the rotation angle sensor shown in FIG. 5
Figure 7:
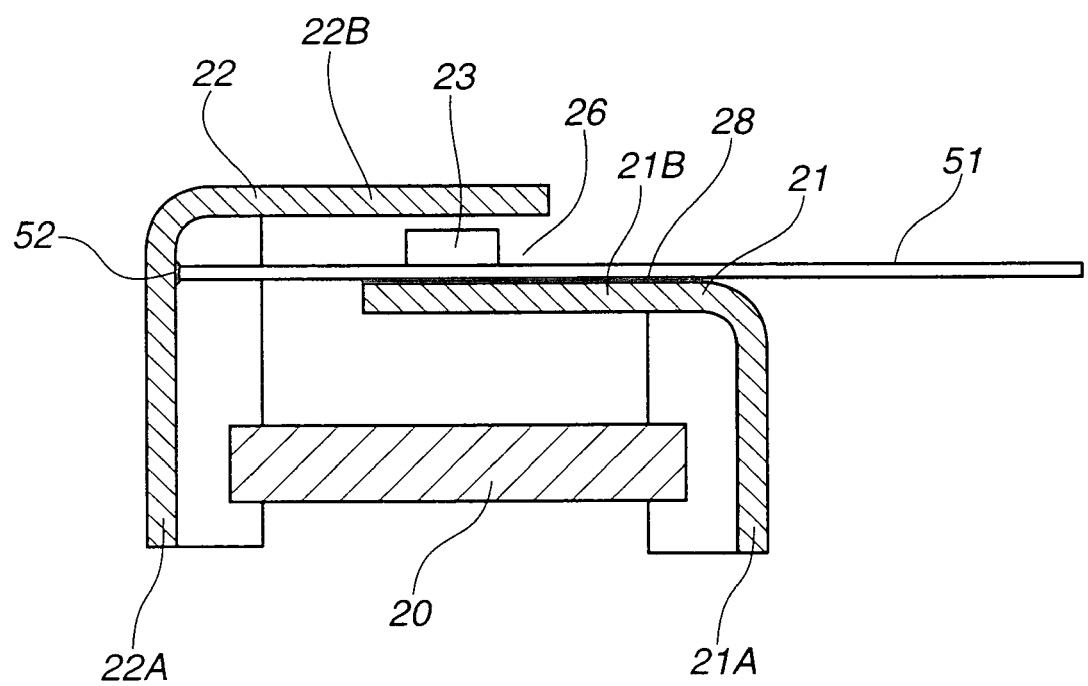
FIG. 7 is a sectional view taken along a section line F7-F7 of FIG. 5.

FIGS. 5~7 show a rotation angle sensor according to a second embodiment of the present invention. In the second embodiment, a printed circuit board (PC board) 51 supporting the Hall effect device 13 has an arcuate end which abuts on the curved surface of the second pole piece portion 22A of the yoke 22 with the interposition of a conductive pattern 52 of a nonmagnetic conductive material such as copper or aluminum. The arcuate end of the board 51 is formed in an arcuate shape fitting to the arcuate second pole piece portion 22A. The conductive pattern 52 is formed on the end face of the arcuate end of the board 51. The conductive pattern 52 is electrically connected with the second pole piece portion 22A by one of welding, clamping, soldering, wire bonding, and nonmagnetic conductive adhesive. In the other points, the rotation angle sensor of the second embodiment is substantially identical to the sensor according to the first embodiment. The conductive pattern 52 is electrically connected to the wiring pattern formed on the surface of the board 51, like the conductive patterns 27 and 28. The wiring pattern is connected with the low or high electric potential side of power supply 101 or 102 connected with the Hall effect device 23. Therefore, the conductive pattern 52 is electrically connected to the low or high electric potential side of power supply connected to the Hall effect device 23. The conductive pattern 52 may include a first portion formed on the upper surface of the board 25 and a second portion formed on the end face of the board 25, like the conductive pattern 27.

The yokes 21 and 22 may be connected with the Hall effect device 23 by the nonmagnetic conductor printed directly on a structural member, such as a circuit board, of the electric circuit or the magnetic circuit. It is possible to reduce a electric potential difference between the yokes 21 and 22, and the electric circuit, by taking a low electric potential side of power supply or a high electric potential side of power supply from a signal processing circuit arranged to take power from a generator (not shown) or a storage battery (not shown) connected with the yokes 21 and 22. The number of Hall effect devices is not limited to one. The rotational angle sensor may includes two or more Hall effect devices.

This application is based on a prior Japanese Patent Application No. 2003-421036. The entire contents of the prior Japanese Patent Application No. 2003-421036 with a filing date of Dec. 18, 2003 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of invention is defined with reference to the following claims.

What is claimed is:

1. A rotation angle sensor comprising:
   a magnet rotatable about a rotation axis and having at least two magnetic poles;
   a yoke located at a position to confront a magnetic pole, and forming a magnetic circuit with the magnet;
   a magnetic sensing device to sense magnetic flux density varying in accordance with a confronting area between the yoke and the magnet; and
   a nonmagnetic conductor electrically connecting the yoke and the magnetic sensing device.

2. The rotation angle sensor as claimed in claim 1, wherein the yoke is connected with a power supply to which the magnetic sensing device is connected.

3. The rotation angle sensor as claimed in claim 1, wherein the rotation angle sensor further comprises a board supporting the magnetic sensing device and the nonmagnetic conductor includes a conductive pattern formed on the board.

4. The rotation angle sensor as claimed in claim 3, wherein the conductive pattern of the nonmagnetic conductor is a pattern printed on the board.

5. The rotation angle sensor as claimed in claim 1, wherein the yoke is located at the position to confront the magnetic pole of the magnet radially; and the magnetic sensing device senses the magnetic flux density varying in accordance with the confronting area between the yoke and the magnet.

6. A rotation angle sensor comprising:
   a magnet rotatable about a rotation axis and having at least two magnetic poles;
   a yoke located at a position to confront a magnetic pole, and forming a magnetic circuit with the magnet;
   a magnetic sensing device to sense magnetic flux density varying in accordance with a confronting area between the yoke and the magnet; and
   a nonmagnetic conductor electrically connecting the yoke and the magnetic sensing device,
   wherein the rotation angle sensor further comprises a board supporting the magnetic sensing device and the nonmagnetic conductor includes a conductive pattern formed on the board, and
   wherein the yoke is a first yoke; the rotation angle sensor further comprises a second yoke located at a position to confront the magnetic pole of the magnet radially, and forming the magnetic circuit with the magnet and the first yoke; the conductive pattern is a first conductive pattern; and the nonmagnetic conductor further includes a second conductive pattern formed on the board.

7. The rotation angle sensor as claimed in claim 6, wherein the first conductive pattern of the nonmagnetic conductor is a pattern formed on a surface of the board, and the second conductive pattern is a pattern formed on a side face of the board.

8. The rotation angle sensor as claimed in claim 6, wherein the first conductive pattern of the nonmagnetic conductor is sandwiched between the first yoke and the board overlapping the first yoke, and the second conductive pattern is formed between the board and the second yoke extending in a direction crossing the board.

9. The rotation angle sensor as claimed in claim 6, wherein each of the first and second yokes includes a pole piece portion extending axially along the rotation axis of the magnet, and an overhang portion extending radially; the magnetic sensing device is supported between the overhang portions of the first and second yokes, by the board extending between the overhang portions of the first and second yokes; the first conductive pattern of the nonmagnetic conductor is sandwiched between the board and the overhang portion of the first yoke; and the second conductive pattern is formed between the board and the pole piece portion of the second yoke.

10. The rotation angle sensor as claimed in claim 9, wherein the magnetic sensing device is mounted on a first surface of the board, and the first conductive pattern is formed on a second surface of the board.

11. The rotation angle sensor as claimed in claim 10, wherein the board is formed with a through hole, and the first conductive pattern is electrically connected through the through hole to a conductor formed on the first surface of the board.

12. The rotation angle sensor as claimed in claim 9, wherein the board is formed with a slot through which the pole piece portion of the second yoke is inserted, and the second conductive pattern is formed on a side of the slot of the board.

13. The rotation angle sensor as claimed in claim 9, wherein the boardincludes a first end abutting on a first surface of the pole piece portion of the second yoke; and the second conductive pattern is formed between the first end of the board and the first surface of the pole piece portionof the second yoke.

14. The rotation angle sensor as claimed in claim 6, wherein the first yoke is connected through the first conductive pattern to one of a low electric potential side and a high electric potential side of a power supply connected with the magnetic sensing device, and the second yoke is connected through the second conductive pattern to one of the low electric potential side and the high electric potential side of the power supply.

15. A rotation angle sensor comprising:
a magnet rotatable about a rotation axis and having at least two magnetic poles;
a yoke located at a position to confront a magnetic pole, and forming a magnetic circuit with the magnet;
a magnetic sensing device to sense magnetic flux density varying in accordance with a confronting area between the yoke and the magnet; and
a nonmagnetic conductor electrically connecting the yoke and the magnetic sensing device,
wherein the rotation angle sensor further comprises a board supporting the magnetic sensing device and the nonmagnetic conductor includes a conductive pattern-formed on the board, and
wherein the nonmagnetic conductor is connected to at least one of the yoke and the board by one of welding, clamping, soldering, wire bonding, and nonmagnetic conductive adhesive.

16. A rotation angle sensor comprising:
a magnet rotatable about a rotation axis and having at least two magnetic poles;
a yoke located at a position to confront a magnetic pole, and forming a magnetic circuit with the magnet;
a magnetic sensing device to sense magnetic flux density varying in accordance with a confronting area between the yoke and the magnet; and
a nonmagnetic conductor electrically connecting the yoke and the magnetic sensing device,
wherein the yoke is a first yoke; the rotation angle sensor further comprises a second yoke located at a position to confront the magnetic pole, and forming the magnetic circuit with the magnet and the first yoke; and the nonmagnetic conductor includes a first conductor electrically connecting the first yoke and the magnetic sensing device, and a second conductor electrically connecting the second yoke and the magnetic sensing device.

\* \* \* \* \*